United States Patent
Kubo

(10) Patent No.: US 7,060,921 B2
(45) Date of Patent: Jun. 13, 2006

(54) WATER-RESISTANT CASE FOR ELECTRONIC DEVICES

(75) Inventor: Takashi Kubo, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 11/200,149

(22) Filed: Aug. 10, 2005

(65) Prior Publication Data

US 2006/0042920 A1    Mar. 2, 2006

(30) Foreign Application Priority Data

Aug. 25, 2004 (JP) .............................. 2004-244677
Aug. 25, 2004 (JP) .............................. 2004-244859

(51) Int. Cl.
*H01H 9/04* (2006.01)

(52) U.S. Cl. ..................... 200/302.1; 200/293; 396/25; 206/316.2

(58) Field of Classification Search .. 200/302.1–302.3, 200/293; 206/316.2, 320, 811; 396/6, 25–29
See application file for complete search history.

(56) References Cited

U.S. PATENT DOCUMENTS

| 4,006,764 | A | * | 2/1977 | Yamamoto et al. ......... 206/320 |
| 5,126,772 | A | * | 6/1992 | Albrecht ...................... 396/26 |
| 5,907,721 | A | * | 5/1999 | Schelling et al. ............. 396/27 |
| 6,007,377 | A | * | 12/1999 | Cook .......................... 439/587 |
| 6,281,454 | B1 | * | 8/2001 | Charles et al. ............ 200/11 R |
| 6,462,291 | B1 | * | 10/2002 | Sachs ...................... 200/302.2 |

* cited by examiner

*Primary Examiner*—K. Lee
(74) *Attorney, Agent, or Firm*—Oblon, Spivak, McClelland, Maier & Neustadt, P.C.

(57) ABSTRACT

The index finger of the right hand of the user is applied to a front surface of a fixed knob, the thumb of the right hand is applied to a rear surface of a movable knob, and the movable knob is slid by the thumb forwardly toward the fixed knob. When the movable knob is slid, a locking member moves forwardly in unison with the movable knob away from engaging surfaces of walls, whereupon opposite ends of the locking member disengage from the engaging surfaces of the walls. A buckle is now swingable out of a cavity about a pivot shaft. Then, the user grips the fixed knob and the movable knob and lifts the free end of the buckle to erect the buckle, and thereafter opens a front case member and a rear case member away from each other.

8 Claims, 11 Drawing Sheets

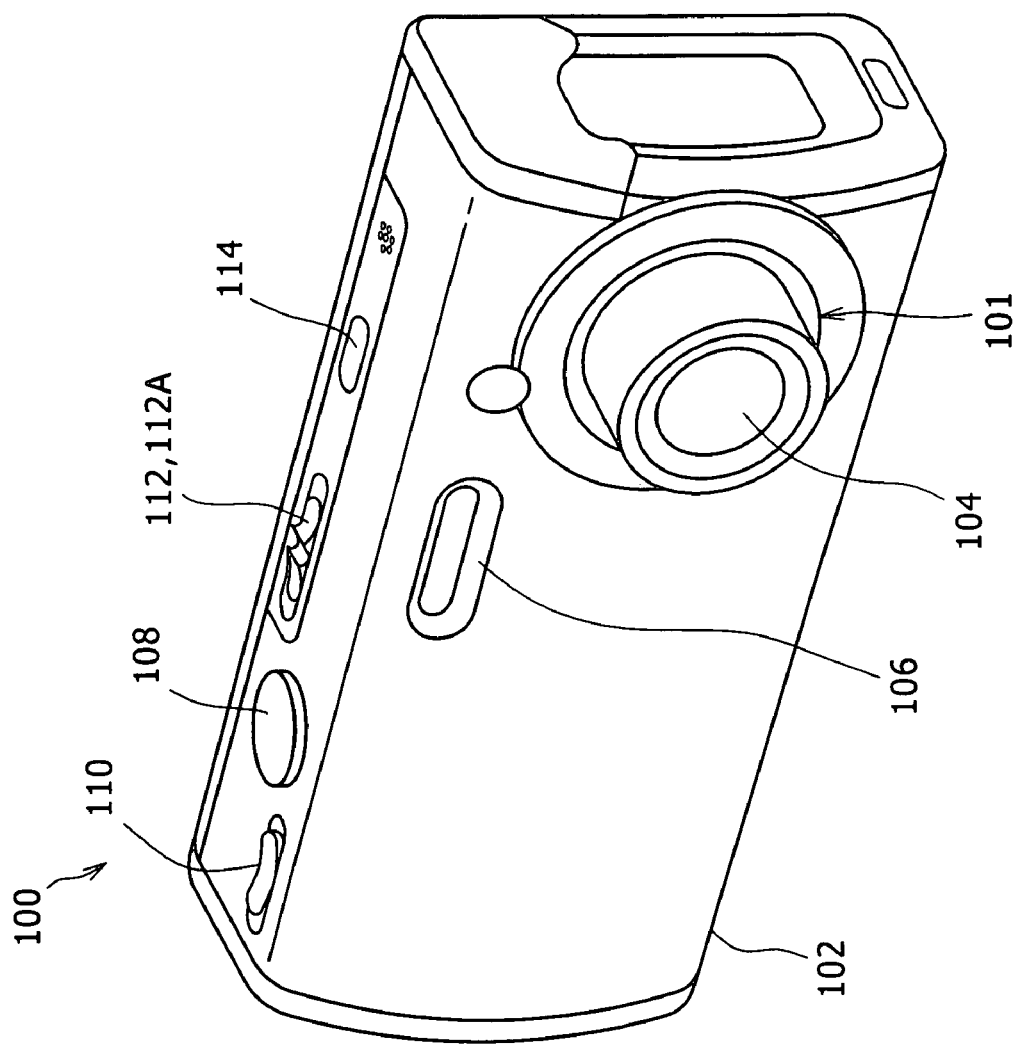

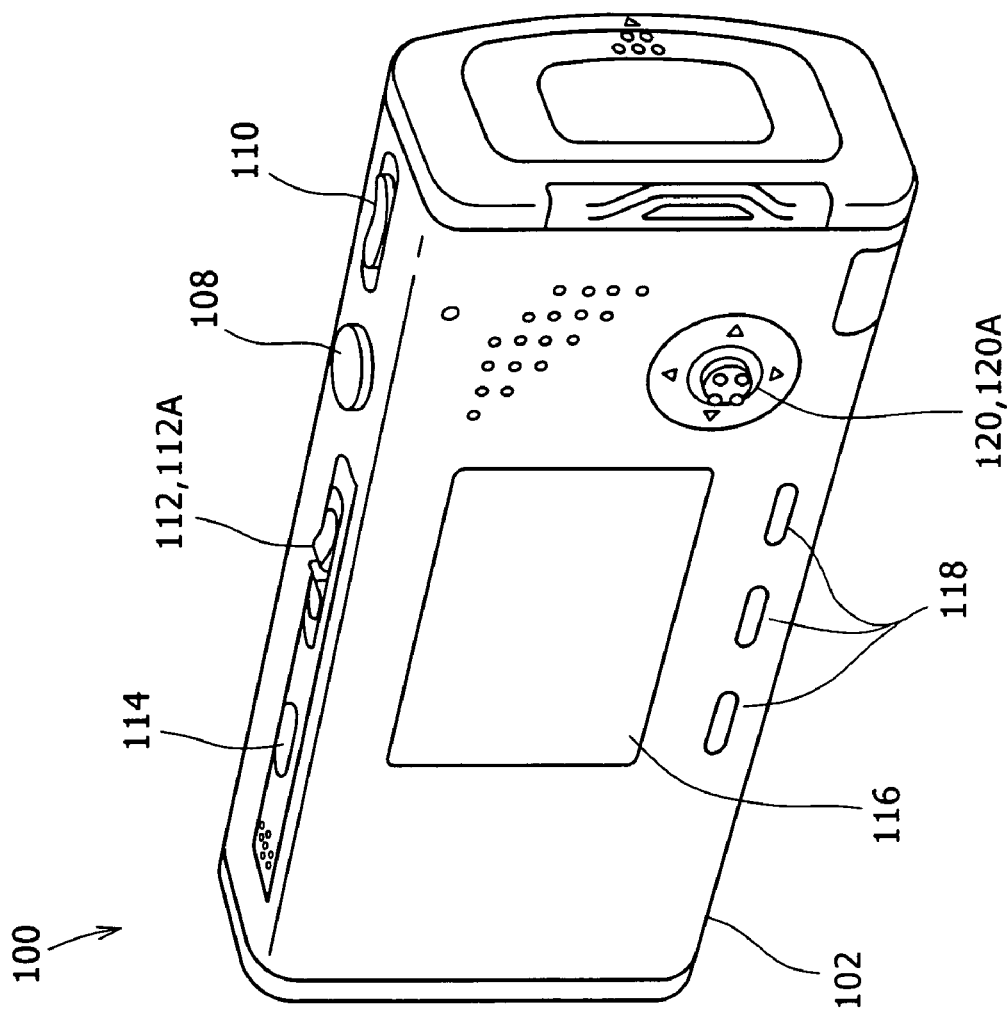

US 7,060,921 B2

WATER-RESISTANT CASE FOR ELECTRONIC DEVICES

BACKGROUND OF THE INVENTION

The present invention relates to a water-resistant case for electronic devices, and more particularly to a water-resistant case for use with small-size electronic devices such as digital cameras, video cameras, etc.

Most water-resistant cases for electronic devices include two case members swingably coupled to each other which, when mated together, provide a water-tight space for accommodating an electronic device, typically a digital camera or a video camera, therein.

A buckle is swingably mounted on a free end of one of the case members. When the buckle is releasably held in engagement with a free end of the other case member, the mating portions of the two case members are kept in a mated state. For details, reference should be made to Japanese Patent Laid-open No. 2002-90869, for example.

According to most of those water-resistant cases, the mating portions are disengaged from each other, i.e., opened, in the same direction as the direction in which a mechanism for engaging and disengaging the buckle is released. If the electronic device to be accommodated in a water-resistant case is of a small size, such as a digital camera, and the water-resistant case is also of a small size, then since it is often customary for the user to put the digital camera into and out of the water-resistant case while the user is walking, the case members tend to be inadvertently opened, letting the digital camera drop out of the case when the mechanism for engaging and disengaging the buckle is released unless the user is careful enough in releasing the mechanism.

SUMMARY OF THE INVENTION

It is an object of the present invention to provide a water-resistant case which allows a mechanism for engaging and disengaging a buckle to be released through a simple action and which prevents an electronic device accommodated in the case from dropping out when the mechanism is released.

To achieve the above object, there is provided in accordance with the present invention a water-resistant case for accommodating an electronic device, including a first case member having a mating portion, a second case member having a mating portion, the first case member and the second case member jointly providing a space for accommodating the electronic device therein when the mating portion of the first case member and the mating portion of the second case member mate with each other, the first case member and the second case member having respective ends swingably coupled to each other, wherein the mating portion of the first case member and the mating portion of the second case member mate with each other when the first case member and the second case member swing relatively to each other about the ends, the first case member having a side wall disposed on a free end of the first case member which is opposite to the end of the first case member, the side wall being disposed outwardly of the mating portion of the first case member, the side wall extending away from the mating portion of the first case member in the direction in which a free end of the second case member which is opposite to the end of the second case member mates with the free end of the first case member, a buckle swingably mounted on the free end of the second case member outwardly of the mating portion of the second case member, a first engaging and disengaging member disposed on the side wall for disengageably engaging the buckle, a second engaging and disengaging member mounted on the buckle for disengageably engaging the first engaging and disengaging member to keep the first case member and the second case member in mating relation to each other when the mating portion of the first case member and the mating portion of the second case member mate with each other and the buckle engages the side wall, a fixed knob mounted on the buckle at a position spaced from a mounted portion of the buckle which is swingably mounted on the free end of the second case member, in a direction away from the mating portions when the mating portion of the first case member and the mating portion of the second case member mate with each other and the buckle engages the side wall, and a movable knob mounted on the buckle closely to a side of the fixed knob which faces the mounted portion, the movable knob being movable toward and away from the fixed knob and normally biased to move toward the mounted portion, wherein when the movable knob is moved toward the fixed knob, the movable knob releases the first engaging and disengaging member and the second engaging and disengaging member out of engagement with each other.

For removing the electronic device from the water-resistant case, the user applies the index finger of the right hand to the fixed knob, and moves the thumb of the right hand to slide the movable knob toward the fixed knob, thereby releasing the first engaging and disengaging member and the second engaging and disengaging member out of engagement with each other.

Since the movable knob is pressed by the thumb away from a pivot shaft by which the first case member and the second case member are swingably coupled to each other and forces are applied by the thumb to keep the first and second case members mating with each other, the first and second case members are prevented from being inadvertently swung open, thereby preventing the electronic device from dropping out.

The above and other objects, features, and advantages of the present invention will become apparent from the following description when taken in conjunction with the accompanying drawings which illustrate a preferred embodiment of the present invention by way of example.

BRIEF DESCRIPTION OF THE DRAWINGS

FIG. 11 is a perspective view of a camera as it is viewed from its front side; and FIG. 12 is a perspective view of the camera as it is viewed from its front side.

DETAILED DESCRIPTION OF THE PREFERRED EMBODIMENT

Figure 1:
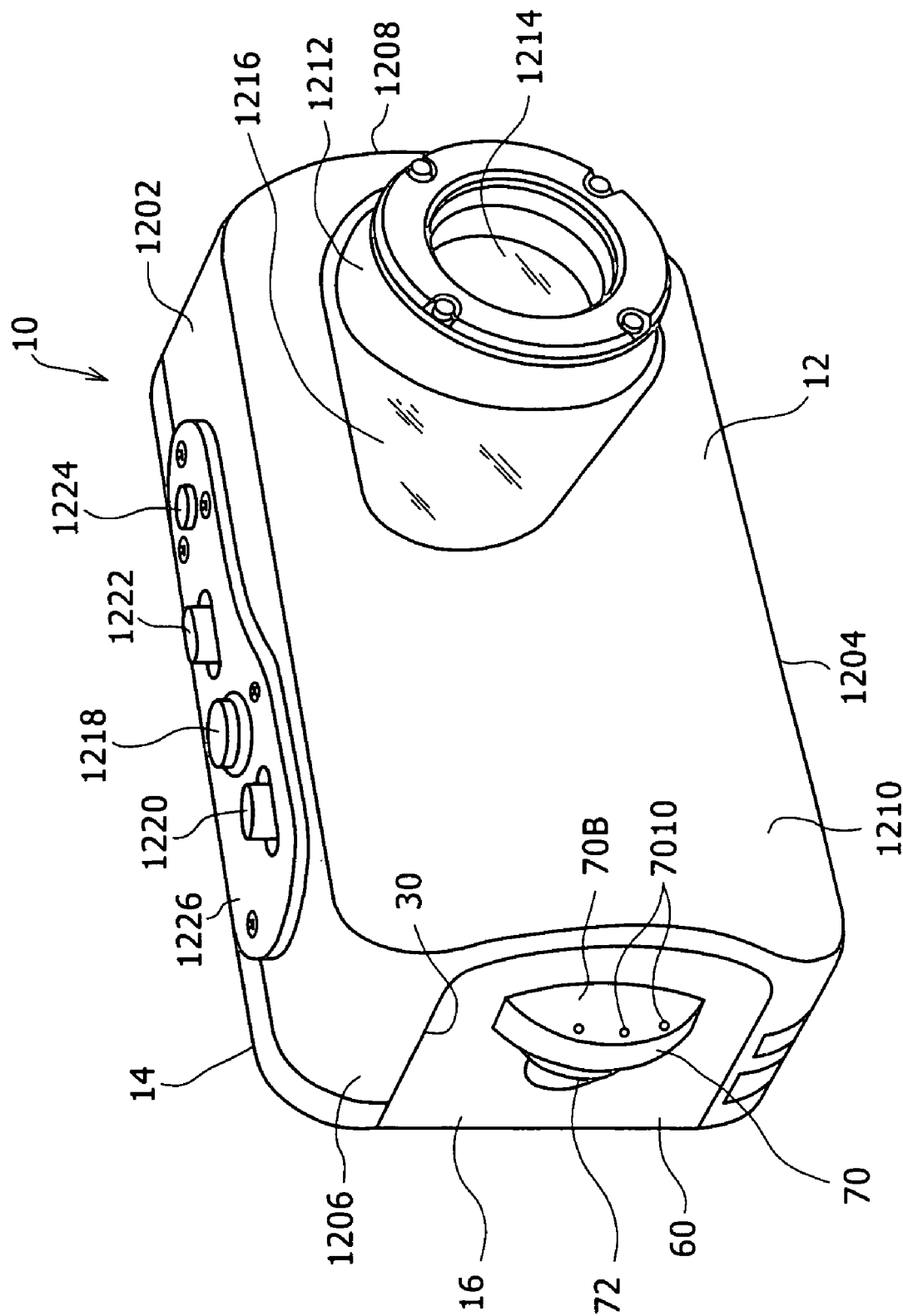
FIG. 1 is a perspective view of a water-resistant case according to the present invention as it is viewed from its front side.

First, a camera as an electronic device to be accommodated in a water-resistant case according to an embodiment of the present invention will be described below with reference to FIGS. 11 and 12.

As shown in FIGS. 11 and 12, a camera 100 to be accommodated in a water-resistant case is a digital still camera and has an outer case 102. In the specification, the terms "left" and "right" refer to the directions as recognized when the water-resistant case and the camera are viewed from their front sides, the term "front" to the side closer to a subject to be photographed by the camera, and the term "rear" to the side closer to an imaging device disposed in the camera.

The camera 100 has a retractable lens barrel 101 disposed on the front side of the case 102 near its right edge and housing an imaging optical system 104 therein. The camera 100 also has a flash unit 106 for emitting flash light, disposed on the front side of the case 102 near its upper edge.

The lens barrel 101 is movable by an actuator assembled in the case 102 between a forwardly projecting active position (a wide-angle mode, a telephoto mode, and an intermediate mode between the wide-angle and telephoto modes) and an accommodated position (retracted position) in the front side of the case 102.

On the upper end surface of the case 102, there are disposed a shutter button 108 for capturing images, a zoom control switch 110 for adjusting the zooming movement of the imaging optical system 104, a mode selector switch 112 for changing between playback modes, and a power switch 114 for turning on and off the power supply of the camera 100.

The camera 100 also has, on its rear side, a display unit 108 for displaying images which are captured, a plurality of operation switches 118 for controlling various modes of operation including capturing, recording, and displaying images, and a control switch 120 for performing various control operations such as to select items from menus displayed on the display unit 116.

The mode selector switch 112 includes a slide switch and has a control member 112A projecting upwardly from the upper end surface of the case 102. The mode selector switch 112 changes between various playback modes when the user slides the control members 112A with fingers.

The control switch 120 has a control member 120A projecting rearwardly from the rear side of the case 102. The control member 120A can be tilted in four directions, i.e., upward, downward, leftward, and rightward directions when the user moves its tip end sideways with a finger, and can also be depressed in a direction into the case 102 when the user presses the tip end with a finger.

Specifically, when the control member 120A is moved in the upward, downward, leftward, and rightward directions, the control switch 120 moves a cursor displayed on the display unit 116 in the corresponding upward, downward, leftward, and rightward directions, or changes (increases or decreases) numerical values displayed on the display unit 116. The control switch 120 can determine a plurality of selective items on the menus displayed on the display unit 116 and enter numerical values displayed in input windows when the user presses the control member 120A.

The camera 100 has an imaging device such as a CCD or a CMOS sensor disposed in the case 102 behind the lens barrel 101, for capturing images of subjects which are focused by the imaging optical system 104. The camera 100 further has an image processor for generating image data based on an image signal output from the imaging device and recording the image data in a recording medium such as a memory card or the like, a display processor for displaying image data on the display unit 116, an actuator, and a controller. The controller serves to control the image processor, the display processor, and the actuator based on switch signals from the shutter button 108, the zoom control switch 110, the mode selector switch 112, the power switch 114, the operation switches 118, and the control switch 120. The controller includes a CPU which operates according to a control program.

The water-resistant case for accommodating the camera 100 will be described in detail below with reference to FIGS. 1 through 10.

As shown in FIGS. 1 through 4, the water-resistant case, generally denoted by 10, includes two separate case members, i.e., a front case member 12 and a rear case member 14 which are swingably coupled to each other. The rear case member 14 has a buckle 16 for being disengageably joined to the front case member 12.

Most of the camera 100 except the rear side thereof is accommodated in the front case member 12. After the camera 100 is placed in the front case member 12, the rear case member 14 is placed over the front case member 12 to cover the rear side of the camera 100, whereupon the camera 100 is housed in the water-resistant case 10.

The front case member 12 is made of synthetic resin, and has an upper wall 1202, a lower wall 1204, a left side wall 1206, a right side wall 1208, and a front wall 1210 which correspond respectively to the upper and lower end surfaces, left and right side surfaces, and a front surface of the case 102 of the camera 100. The front case member 12 has a rearwardly open cross-sectionally rectangular space defined inwardly of the walls 1202, 1204, 1026, 1208, and 1210, the space being complementary in shape to the camera 100.

As shown in FIG. 1, the front wall 1210 has a tubular boss 1212 disposed on an outer surface thereof for accommodating the lens barrel 101 therein. The tubular boss 1212 has an opening defined in its front end and closed by a transparent plate 1214.

The front wall 1210 also has a transparent plate 1216 positioned forwardly of the flash unit 106 of the camera 100 as it is placed in the front case member 12, for passing flash light emitted by the flash unit 106 forwardly through the transparent plate 1216.

The upper wall 1202 has on its upper surface an operation member 1218 for operating the shutter button 108, an operation member 1220 for operating the zoom control switch 110, an operation member 1222 for operating the mode selector switch 112, and an operation member 1224 for operating the power switch 114. These operation members 1218, 1220, 1222, 1224 are surrounded by an ornamental panel 1226 disposed on the upper wall 1202.

Figure 3:
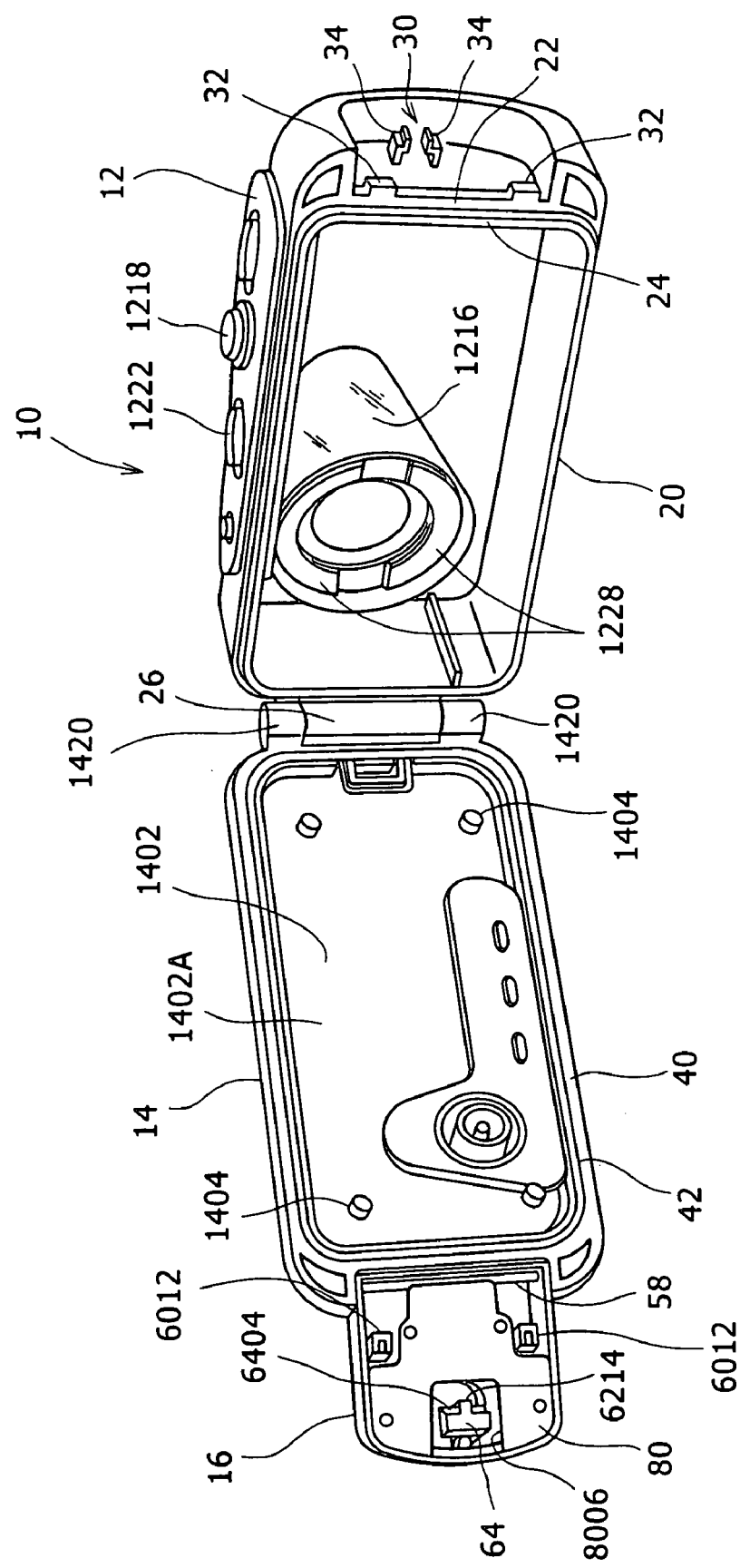
FIG. 3 is a perspective view of the water-resistant case, showing a front case member and a rear case member which are opened away from each other when the water-resistant case is erected.

As shown in FIG. 3, cushion members 1228 are applied to an inner surface of the front wall 1210 at the base of the tubular boss 1212. When the camera 100 is placed in the front case member 12, the cushion members 1228 are resiliently held against the front surface of the camera 100 to prevent the camera 100 from wobbling back and forth.

Similar cushion members, not shown, are also applied to a left end of the inner surface of the front wall 1210.

The front case member 12 has a rear end shaped as a rectangular frame by the upper wall 1202, the lower wall 1204, the left side wall 1206, and the right side wall 1208. The rear end shaped as the rectangular frame serves as a mating portion 20 for mating with the rear case member 14. The mating portion 20 has its inner space providing the opening of the cross-sectionally rectangular space defined in the front case member 12.

Figure 6A:
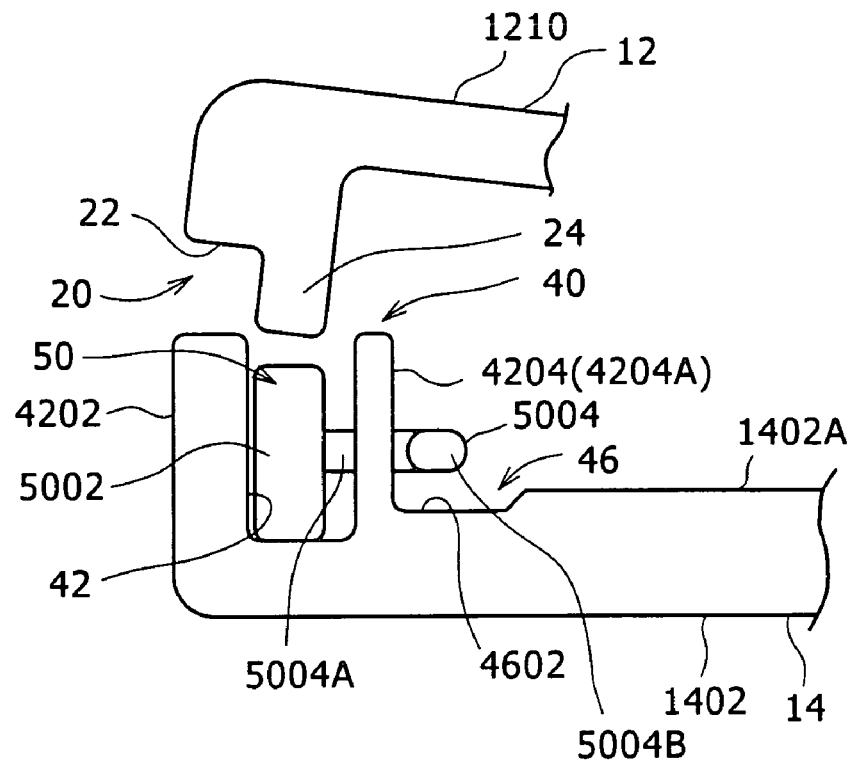
FIGS. 6A and 6B are fragmentary cross-sectional views showing a groove, a ridge, and a seal member.

As shown in FIGS. 3 and 6A, the mating portion 20 has its cross-sectional shape including a flat surface 22 extending vertically and a ridge 24 projecting rearwardly from an inner edge of the flat surface 22. The flat surface 22 and the ridge 24 extend continuously along the full circumference of the mating portion 20.

A vertically extending tubular bearing 26 is disposed on the rear end of the right side wall 1208 and positioned outwardly of the mating portion 20.

Figure 5:
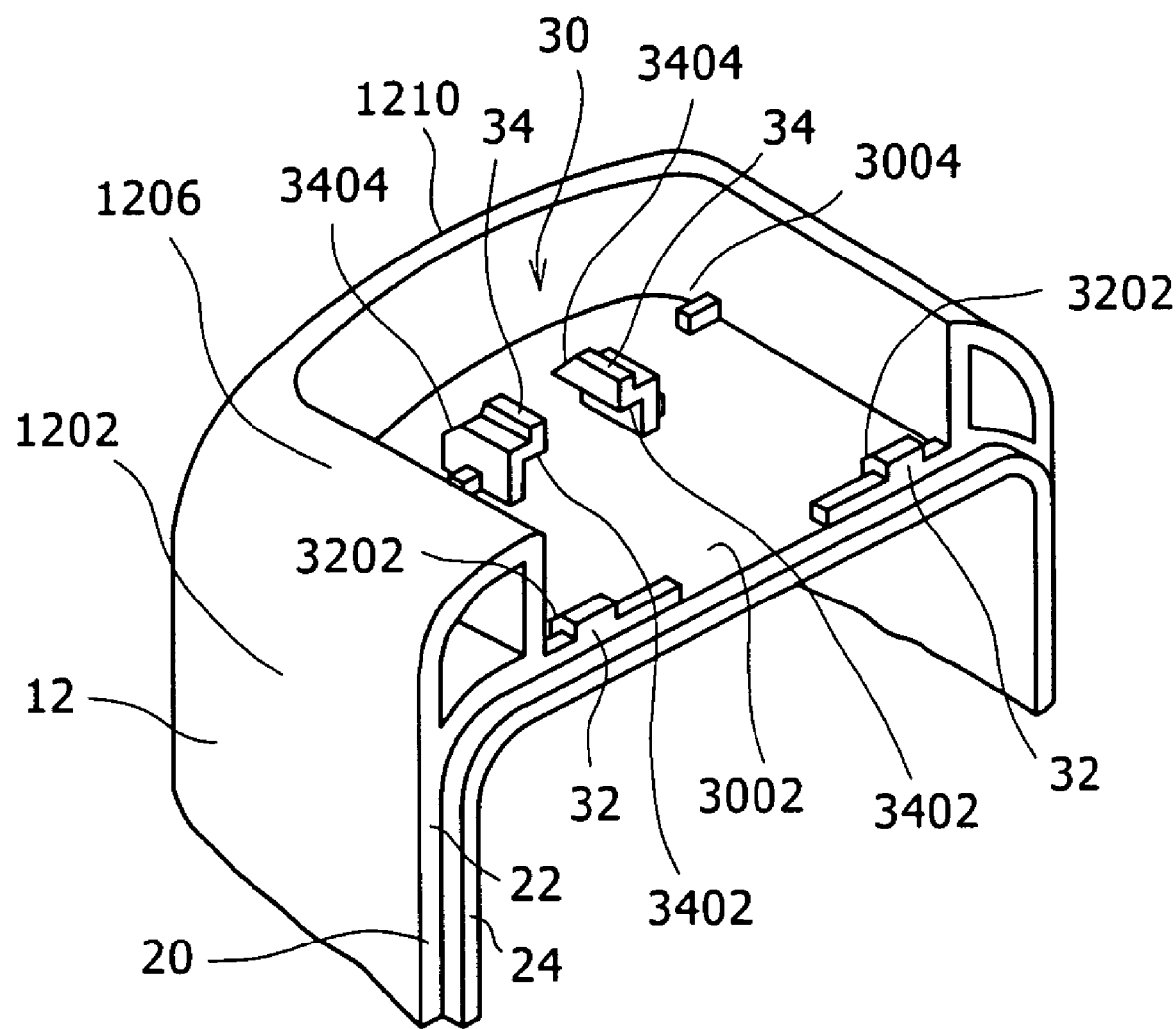
FIG. 5 is a perspective view showing a cavity for housing a buckle therein.

As shown in FIG. 5, the left side wall 1206 has a cavity 30 for housing the buckle 16 therein.

The cavity 30 has a flat bottom surface 3002 and two vertically spaced engaging walls 32 disposed on the flat bottom surface 3002 near the mating portion 20. The engaging walls 32 have respective slanted surfaces 3202 on their upper front edges.

Two vertically spaced walls 34 project from a vertically central area of the flat bottom surface 3002 of the cavity 30 near the front wall 1210. The walls 34 have respective engaging surfaces 3402 disposed on their upper confronting portions and extending parallel to the flat bottom surface 3002 of the cavity 30 in facing relation thereto. The walls 34 have respective slanted surfaces 3404 on their upper front edges. The two walls 34 and the engaging surfaces 3402 jointly serve as a second engaging and disengaging member as claimed.

A plurality of abutment walls 3004 for abutting against the buckle 16 are disposed on the flat bottom surface 3002 of the cavity 30.

Figure 2:
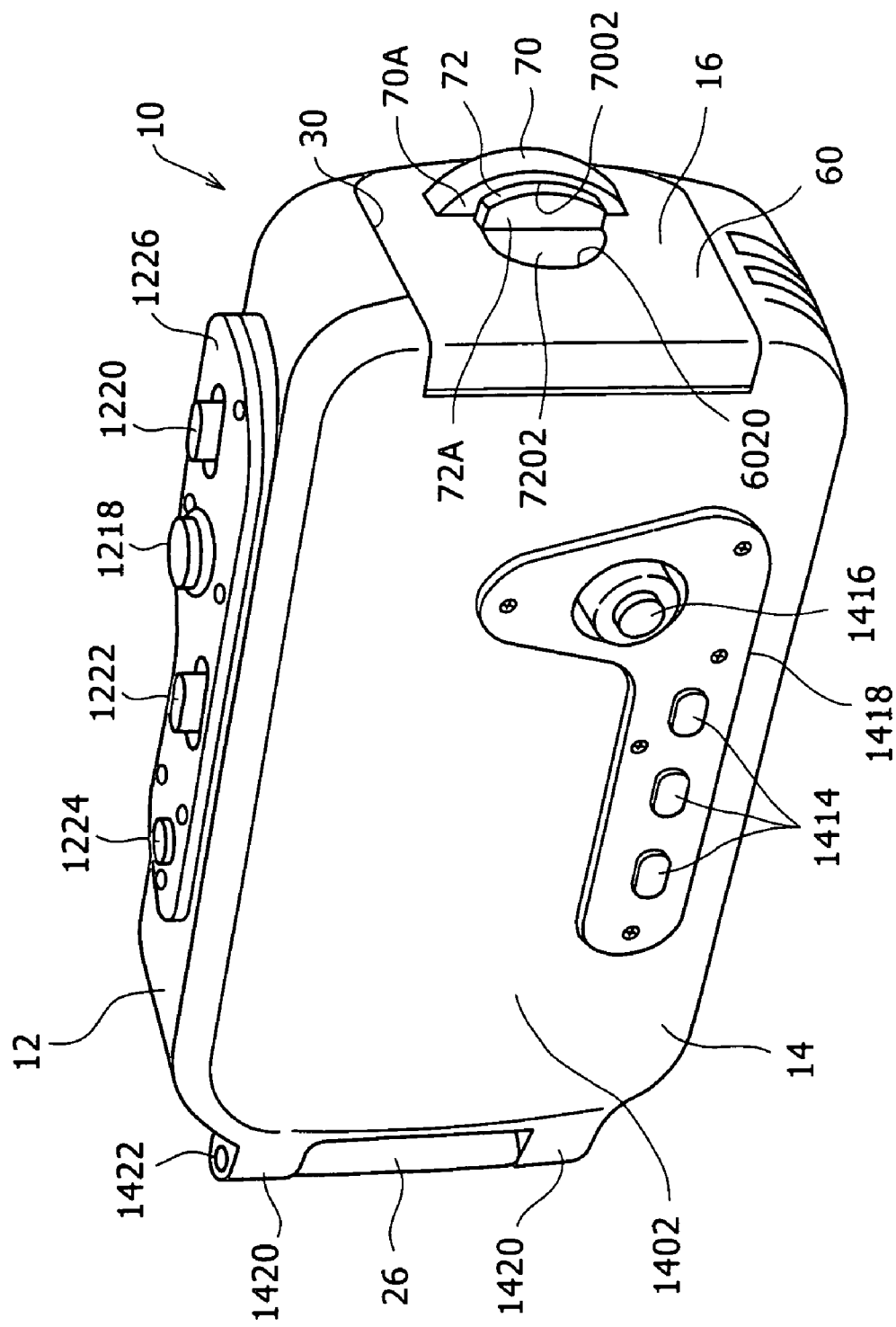
FIG. 2 is a perspective view of the water-resistant case as it is viewed from its rear side.
Figure 4:
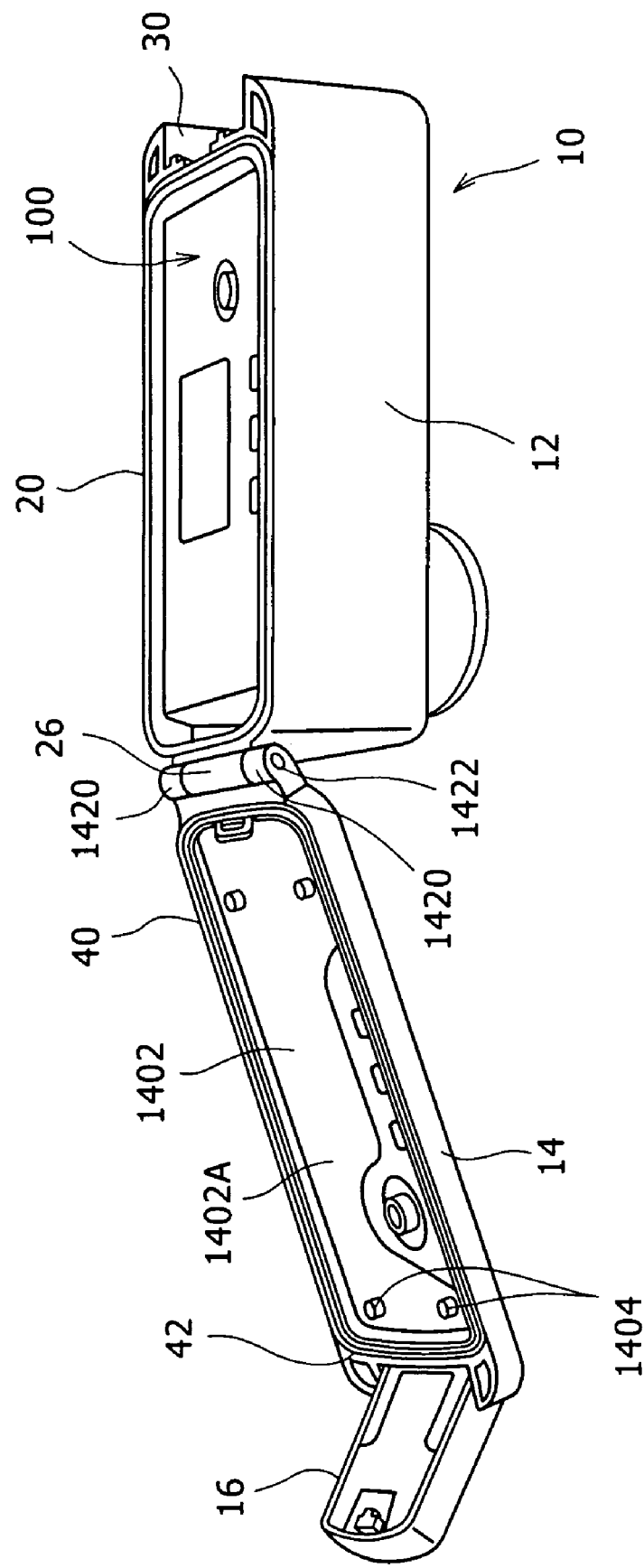
FIG. 4 is a perspective view of the water-resistant case, showing the front case member and the rear case member which are opened away from each other when the water-resistant case is turned with its front side down.

As shown in FIGS. 2 through 4, the rear case member 14 has a flat rectangular rear wall 1402 for covering the rear surface of the camera 100 that is accommodated in the front case member 12. The rear wall 1402 has an inner surface 1402A facing the rear surface of the camera 100. Cushion members 1404 made of rubber or the like project from respective four corners of the inner surface 1402A for being resiliently held against the rear surface of the camera 100 to prevent the camera 100 from wobbling back and forth.

A mating portion 40 in the shape of a rectangular frame for mating engagement with the mating portion 20 of the front case member 12 projects from the outer peripheral edge of the inner surface 1402A of the rear wall 1402.

As shown in FIG. 2, the rear wall 1402 has on its outer surface operation members 1414 for operating the operation switches 118 and an operation member 1416 for operating the control switch 120. These operation members 1414, 1416 are surrounded by an ornamental panel 1418 disposed on the rear wall 1402. The rear case member 14 is made of transparent synthetic resin to allow the user to see the display unit 116 while the camera 100 is being housed in the water-resistant case 10.

Vertically spaced tubular bearing 1420 are disposed on the right side edge of the rear case member 14. The buckle 16 is disposed on the left side edge of the rear case member 14.

The bearing 26 of the front case member 12 is inserted between the vertically spaced tubular bearing 1420, and a pivot shaft 1422 is inserted through these bearings 1420, 26 to keep the front case member 12 and the rear case member 14 pivotally coupled to each other.

The mating portion 40 has a forwardly open groove 42 defined fully peripherally in the front edge thereof for receiving the ridge 24 of the mating portion 20.

Figure 6B:
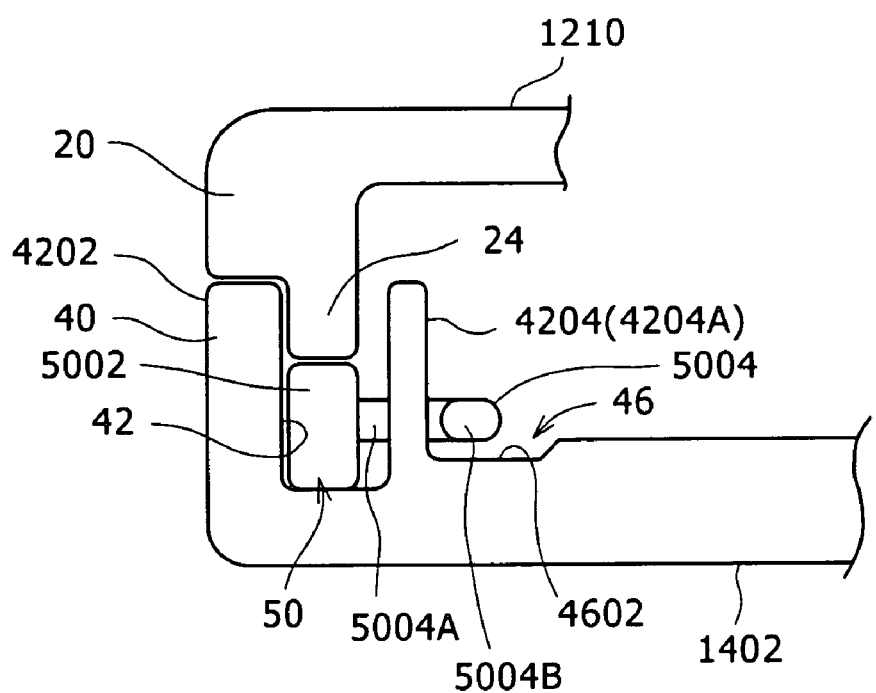
Figure 7:
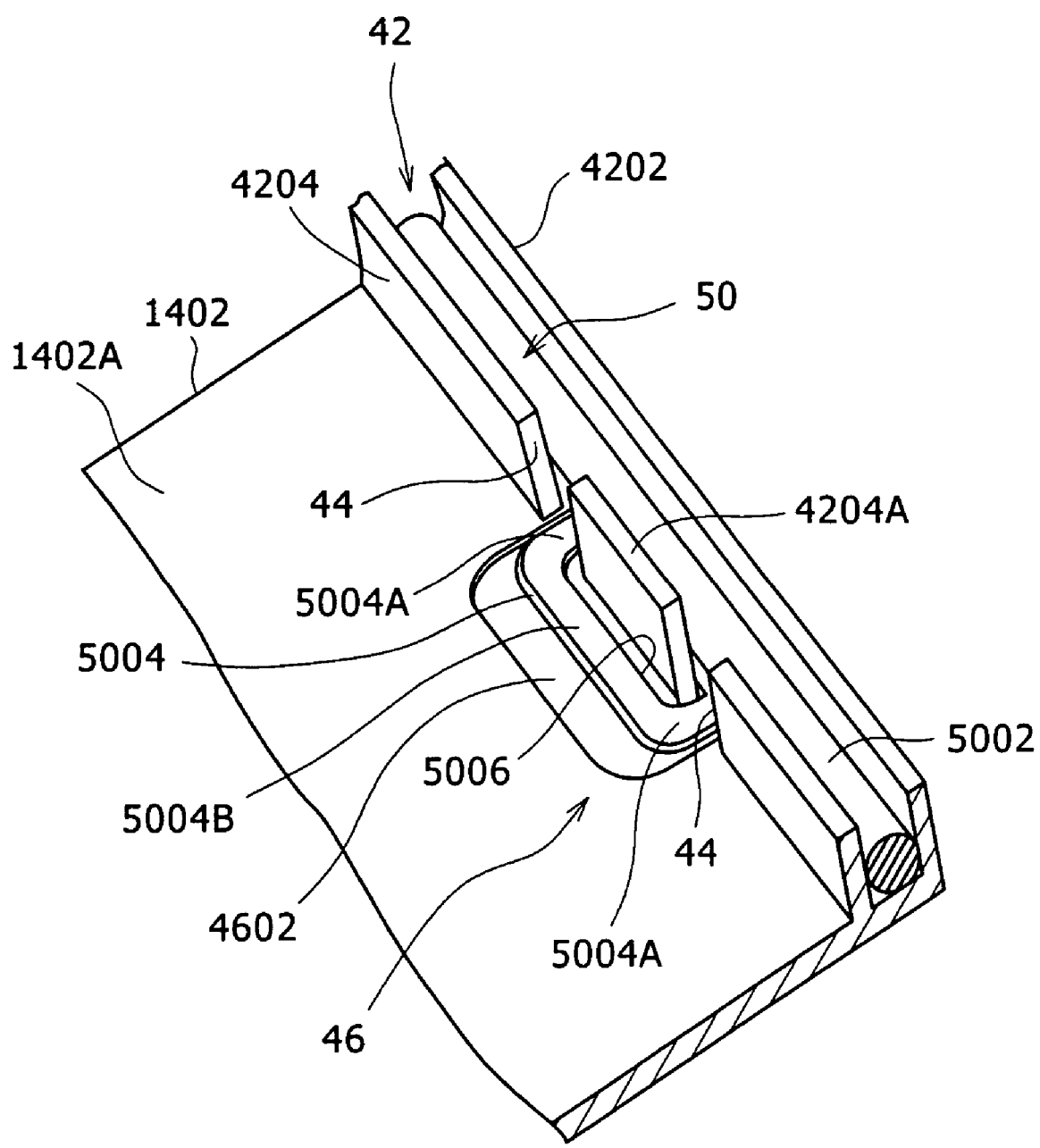
FIG. 7 is a perspective view of a knob.

As shown in FIGS. 6A, 6B, and 7, the groove 42 is defined between an outer wall 4202 disposed in an outer position on the rear case member 14 and an inner wall 4204 disposed in an inner position on the rear case member 14.

The outer wall 4202 has a distal end shaped as a flat surface which is held close to the flat surface 22 when the mating portion 20 of the front case member 12 and the mating portion 40 of the rear case member 14 mate with each other.

As shown in FIG. 7, the portion of the inner wall 4204 which extends vertically on the right side edge of the rear case member 14 has two vertically spaced recesses 44 defined vertically centrally therein.

The groove 42 is open into the inner space in the rear case member 14, i.e., the inner surface 1402A of the rear wall 1402, through the two recesses 44. The inner wall 4204 includes an inner wall portion 4204A left between the two recesses 44.

The inner surface 1402A of the rear wall 1402 has a recess 46 defined therein at the two recesses 44 and the inner wall portion 4204A. The recess 46 has a bottom surface 4602 deeper than the inner surface 1402A.

A seal member 50 is inserted in the groove 42.

The seal member 50 includes a main body 5002 in the form of a rectangular frame inserted in the groove 42 throughout its entire length, and a knob 5004 projecting inwardly from the main body 5002.

The seal member 50 is made of an elastic material such as rubber or the like. The main body 5002 of the seal member 50 has such a cross-sectional shape that it has a width smaller than the width of the groove 42 and a height smaller than the depth of the groove 42 so that the main body 5002 can be inserted into the groove 42. As shown in FIGS. 6A and 6B, when the mating portion 20 of the front case member 12 and the mating portion 40 of the rear case member 14 mate with each other, the main body 5002 is compressed by the ridge 24 in the groove 42, joining the mating portions 20, 40 to each other in a water-tight fashion against a water pressure in the range from 2 to 3 m in the present embodiment.

The knob 5004 is engaged by a finger or a nail of the user to remove the seal member 50 from the groove 42.

The knob 5004 has two arms 5004A projecting from two longitudinally spaced regions of the main body 5002 through the respective recesses 44 into the rear case member 14, and a joint arm 5004B extending along and parallel to an inner surface of the inner wall portion 4204A between the two recesses 44 and interconnecting the distal ends of the two arms 5004A. The main body 5002, the two arms 5004A, and the joint arm 5004B jointly define a rectangular opening 5006 therebetween. The inner wall portion 5004A is inserted in the opening 5006. With this arrangement, the knob 5004, i.e., the joint arm 5004B, is of a relatively large size while the sealing capability of the seal member 50 is maintained.

In the present embodiment, in order to allow the user to put a finger or a nail into easy engagement with the knob 5004, as shown in FIGS. 6A and 6B, the recess 46 defined in the rear wall 1402 of the rear case member 14 is of a size large enough to place the knob 5004 therein and the bottom surface 4602 of the recess 46 extends away from the inner wall portion 4204A beyond the joint arm 5004B placed in the recess 46 so as to be exposed outwardly of the joint arm 5004B.

As shown in FIG. 6A, the knob 5004 projects from a vertically intermediate portion of the main body 5002. When the mating portion 20 of the front case member 12 and the mating portion 40 of the rear case member 14 disengage from each other, the knob 5004 is positioned upwardly of the bottom 4602 with a gap being left therebetween.

The buckle 16 will be described in detail below. In the description of the buckle 16 and parts thereof, the terms "upper", "lower", "front", "rear", "left", and "right" will be used with respect to the buckle 16 as it is assembled on the rear case member 14, housed in the cavity 30, and extends in the forward and rearward directions of the camera 100.

Figure 8:
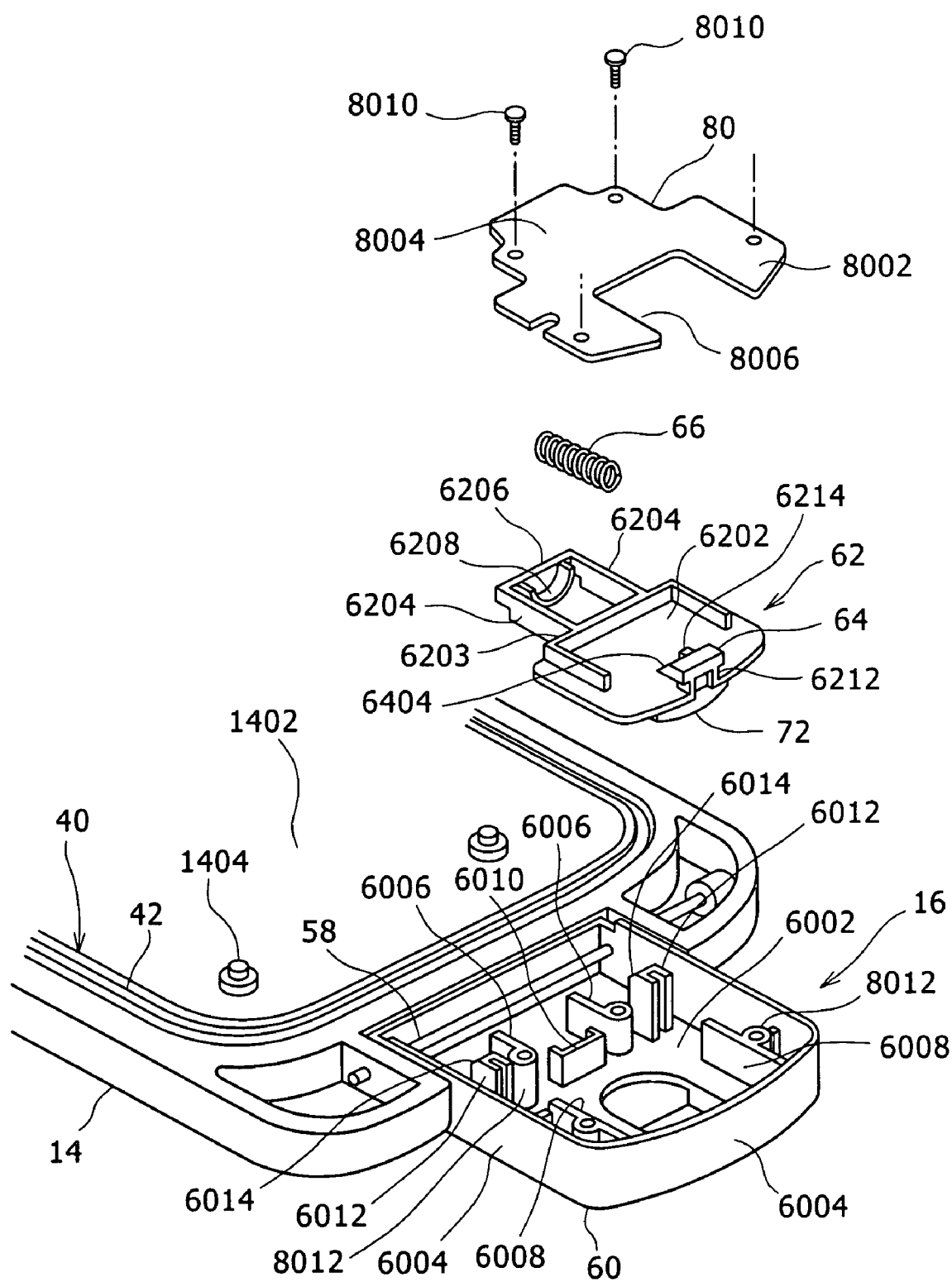
FIG. 8 is an exploded perspective view of a buckle.

As shown in FIGS. 3 and 8, the buckle 16 is swingably coupled to the left side edge of the rear case member 14 by a pivot shaft 58 which has upper and lower ends mounted on the left side edge of the rear case member 14. Specifically, the buckle 16 is mounted on left side edge, i.e., the free end, of the rear case member 14 by the pivot shaft 58. The pivot shaft 58 corresponds to a mounted portion of the buckle 16, is disposed on one end, i.e., a rear end, of the buckle 16. The buckle 16 has a free end, i.e., a front end, remote from the pivot shaft 58.

As shown in FIGS. 1, 2, and 8, the buckle 16 includes a case body 60, a slider 62, a locking member 64, a helical spring 66, a fixed knob 70, a movable knob 72, and a plate 80.

Figure 9:
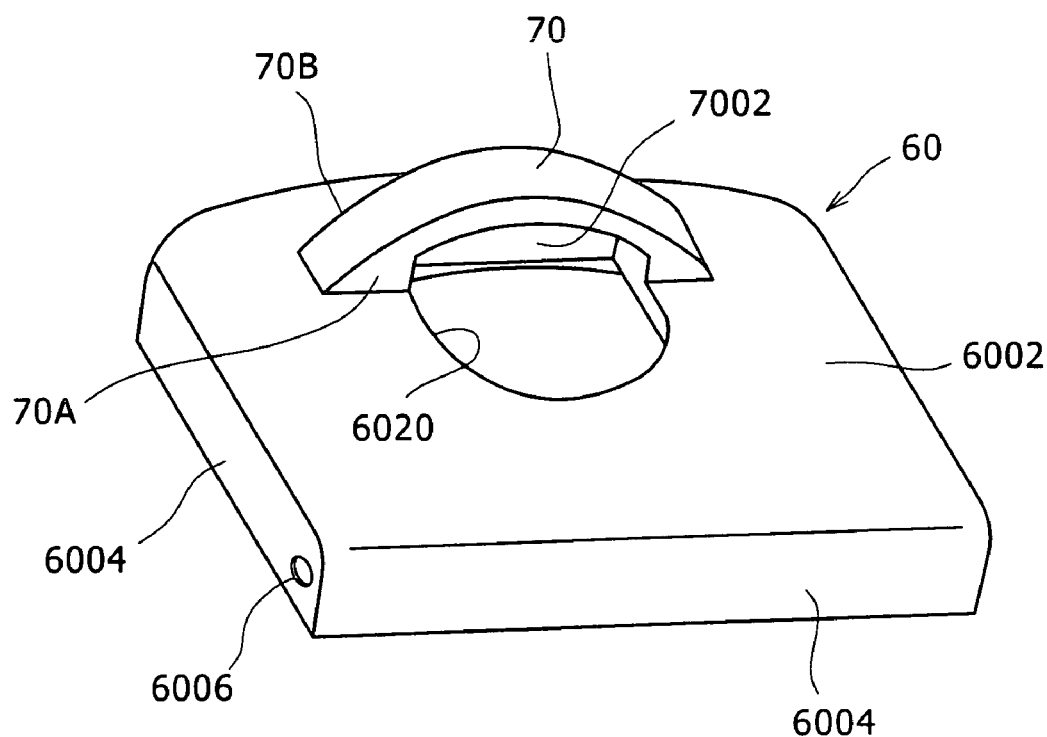
FIG. 9 is a perspective view of a case body of the buckle.

As shown in FIGS. 1, 2, 8, and 9, the case body 60 is of such a size which can be inserted into the cavity 30 of the front case member 12. The case body 60 has a substantially rectangular body wall 6002 shaped complementarily to the contour of the cavity 30, and a side wall 6004 bent from the four sides of the body wall 6002. More specifically, the body wall 6002 has a front portion curved complementarily to the front edge of the cavity 30. As shown in FIG. 9, the case body 60 has a hole 6006 defined in the portion of the side wall 6004 on the rear end of the case body 60. The pivot shaft 58 is inserted through the hole 6006. With the buckle 16 being housed in the cavity 30, the outer surface of the buckle 16 and the outer surface of the left side wall 1206 of the front case member 12 lie flush with each other.

As shown in FIG. 8, a pair of guide walls 6006 and a pair of guide walls 6008 are disposed in confronting relation to each other on the inner surface of the body wall 6002 surrounded by the side wall 6004. The slider 62 is movably supported on the guide walls 6006, 6008 for movement toward and away from the pivot shaft 58 in the forward and rearward directions of the water-resistant case 10. The pair of guide walls 6006 and the pair of guide walls 6008 are spaced from each other in the forward and rearward directions of the water-resistant case 10.

An engaging wall 6010 engaging an end of the helical spring 66 projects from the inner surface of the body wall 6002 between the guide walls 6006.

Two engaging walls 6012 are disposed on the inner surface of the body wall 6002 in alignment with the respective engaging walls 32 in the cavity 30. The engaging walls 6012 have respective slanted surfaces 6014 on their upper rear edges.

When the mating portion 20 of the front case member 12 and the mating portion 40 of the rear case member 14 mate with each other and the buckle 16 is turned or folded into the cavity 30, the front surfaces of the engaging walls 32 and the rear surfaces of the engaging walls 6012 are brought into contact with each other, preventing the buckle 16 from moving in the cavity 30 toward the pivot shaft 58. The slanted surfaces 3202, 6014 allow the front surfaces of the engaging walls 32 and the rear surfaces of the engaging walls 6012 to be brought into smooth contact with each other.

As shown in FIG. 9, the fixed knob 70 is disposed on the outer surface of the body wall 6002 closely to a front end of the body wall 6002 which is remote from the pivot shaft 58.

The fixed knob 70 is of a size that can easily be gripped by fingers, and has an arcuate bulging shape extending vertically.

The fixed knob 70 has a rear surface 70A facing toward the pivot shaft 58 and having a housing recess 7002 for housing therein the movable knob 72 as it is displaced toward the pivot shaft 58. A recess 6020, defined through the body wall 6002, extends from the housing recess 7002 rearwardly toward the pivot shaft 58. The recess 6020 has an arcuate edge closer to the pivot shaft 58.

The fixed knob 70 has a front surface 70B facing away from the pivot shaft 58 and having a plurality of protruding dots 7010 for allowing the user to grip the fixed knob 70 easily with fingers, as shown in FIG. 1.

Figure 10:
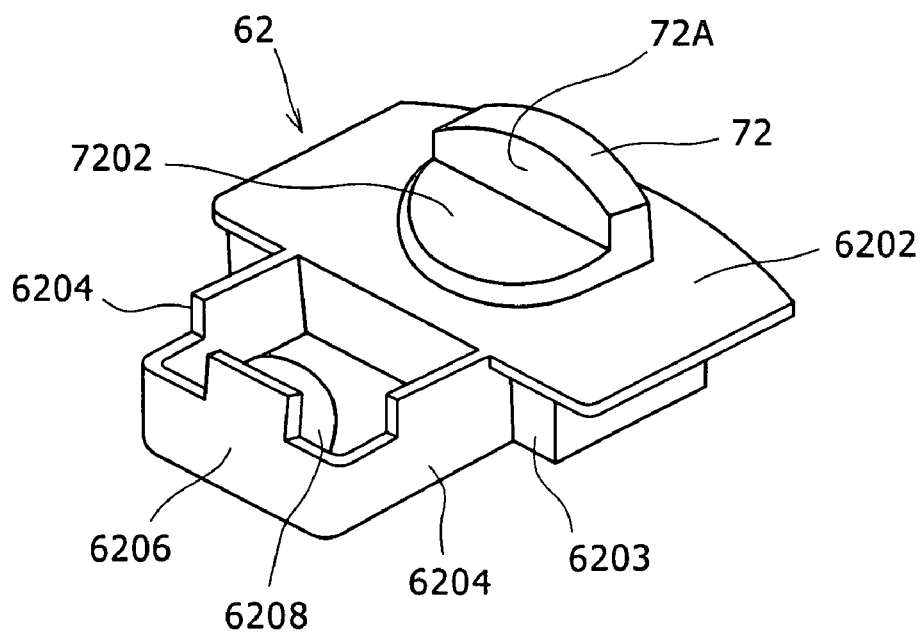
FIG. 10 is a perspective view of a slide member of the buckle.

As shown in FIGS. 8 and 10, the slider 62 has a body plate 6202 having an outer surface placed on the inner surface of the body wall 6002.

The inner surface of the body plate 6202 has a stiffener rib 6203 projecting therefrom. A pair of guide walls 6204 projects from the stiffener rib 6203 rearwardly of the body plate 6202. The guide walls 6204 are slidable against the respective guide walls 6006 of the case body 60.

The guide walls 6204 have respective rear ends interconnected by a joint wall 6206 which is engaged by a rear end of the helical spring 66. The helical spring 66 has a rear portion inserted in a semiarcuate wall 6208 disposed on the joint wall 6206.

The locking member 64 is disposed on the front end of the inner surface of the body plate 6202.

As shown in FIG. 8, the locking member 64 is disposed on distal ends of legs 6212 and a stiffener rib 6214 which projects from the inner surface of the body plate 6202. The locking member 64 lies parallel to and is spaced from the inner surface of the body plate 6202. The locking member 64 has opposite ends disengageably engage the respective engaging surfaces 3402 of the walls 34 in the cavity 30. The locking member 64 has a slanted surface 6404 on its rear edge for engaging the slanted surfaces 3404 of the walls 34. The locking member 64 serves as a first engaging and disengaging member as claimed.

As shown in FIG. 10, the movable knob 72 is disposed on the outer surface of the body plate 6202 near the front end thereof where the locking member 64 is positioned.

More specifically, a bottom plate 7202 is disposed centrally on the outer surface of the body plate 6202 for being housed in the recess 6020 defined in the body wall 6002. The movable knob 72 is of an arcuate shape projecting from the front end of the bottom plate 7202.

The bottom plate 7202 is of such dimensions that it is accommodated in the recess 6020 and movable therein in directions toward and away from the pivot shaft 58, i.e., in the forward and rearward directions of the water-resistant case 10. The bottom plate 7202 has an arcuate-shaped rear portion complementary to the recess 6020.

The movable knob 72 and the housing recess 7002 are constructed such that when the bottom plate 7202 is housed in the recess 6020 and has its rear end engaging the arcuate rear end of the recess 6020, i.e., when the bottom plate 7202 is closest to the pivot shaft 58 or most retracted, the movable knob 72 has its front end placed in the housing recess 7002 and has most of it except the front end exposed from the fixed knob 70.

The movable knob 72 and the housing recess 7002 are also constructed such that when the bottom plate 7202 is housed in the recess 6020 and has its front end engaging the front end of the recess 6020, i.e., when the bottom plate 7202 is remotest from the pivot shaft 58 or most advanced, the movable knob 72 is placed entirely in the housing recess 7002 and has a rear surface 72A positioned forwardly of the rear surface 70A of the fixed knob 70.

The movable knob 72 is colored differently from the fixed knob 70 so that it can easily be visually identified as a manually operable member. According to the present embodiment, the case body 60 including the fixed knob 70 is made of a white synthetic resin, and the slider 62 including the movable knob 72 is made of a gray synthetic resin. Therefore, the movable knob 72 and the bottom plate 7202 which are differently colored are positioned near the fixed knob 72, allowing the user to recognize instantaneously which area of the buckle 16 is to be operated to remove the buckle 16 from the cavity 30.

The slider 62 is assembled in the case body 60 by the plate 80 shown in FIG. 8.

The plate 80 is made of metal, and has a front wider portion 8002 and a rear narrower portion 8004. The wider portion 8002 has a forwardly open recess 8006 defined therein. The recess 8006 is of a size large enough to accommodate therein the two walls 34 projecting from the bottom surface 3002 of the cavity 30.

The slider 62 is assembled into the case body 60 as follows: The guide walls 6204 are positioned between the guide walls 6006 of the body wall 6002, and the body plate 6202 is positioned between the guide walls 6008. The outer surface of the body plate 6202 is placed on the body wall 6002, the bottom plate 7202 is housed in the recess 6020, and the movable knob 72 is placed in the housing recess 702. The guide walls 6204 are thus supported by the guide walls 6006 of the body wall 6002 for movement in the forward and rearward directions, and the body plate 6202 is supported by the guide walls 6008 for movement in the forward and rearward directions.

Then, the rear portion of helical spring 66 is inserted in the semiarcuate wall 6208, and the front and rear ends of the helical spring 66 are brought into engagement with the engaging wall 6010 and the joint wall 6206. The movable knob 72 and hence the slider 62 are normally biased to move rearwardly toward the pivot shaft 58 under the bias of the helical spring 66. Specifically, the movable knob 72 and hence the slider 62 are normally biased such that the rear end of the bottom plate 7202 engages the arcuate rear end of the recess 6020, and most of the movable knob 72 except the front end is exposed from the fixed knob 70 rearwardly toward the pivot shaft 58.

Then, the place 80 is placed on the slider 62 over the inner surface of the body wall 6002 of the case body 60, and fastened to the body wall 6002 by screws 8010. In the present embodiment, the screws 8010 are threaded respectively into bosses 8012 positioned on outer sides of the guide walls 6006, 6008.

With the plate 80 mounted on the base body 60 as shown in FIG. 3, the locking member 64 is positioned in the recess 8006 and the engaging walls 6012 are exposed on both sides of the rear narrower portion 8004.

The water-resistant case 10 is used as follows:

First, a process of accommodating the camera 100 into the water-resistant case 10 will be described below.

The camera 100 is inserted into the front case member 12 through the mating portion 20 thereof with the front surface of the camera 100 facing the front wall 1210 of the front case member 12.

Then, the rear case member 14 is turned to cause the mating portion 40 thereof to mate with the mating portion 20 of the front case member 12. The seal member 50 is compressed in the groove 42 by the ridge 24, joining the mating portions 20, 40 to each other in a water-tight fashion.

Thereafter, the buckle 16 is turned so as to be folded into the cavity 30.

When the buckle 16 is thus folded, the wall surfaces of the engaging walls 32, 6012 contact each other, preventing the buckle 16 from moving rearwardly toward the pivot shaft 58 in the cavity 30.

At the same time, the upper front edges of the walls 34 and the rear edge of the locking member 64 engage each other through the slanted surfaces 3404, 6404, and the slider 62 moves forwardly away from the pivot shaft 58 against the bias of the helical spring 66. Most of the movable knob 72 is now housed in the housing recess 7002.

As the buckle 16 is turned into the cavity 30 until the opposite ends of the locking member 64 are positioned beneath the engaging surfaces 3402 of the walls 34, the slider 62 springs back rearwardly toward the pivot shaft 58 under the bias of the helical spring 66. The opposite ends of the locking member 64 now engage the respective engaging surfaces 3402 of the walls 34, keeping the buckle 16 housed in the cavity 30.

The rear end of the bottom plate 7202 of the slider 62 engages the arcuate rear end of the recess 6020, and the front end of the movable knob 72 is placed in the housing recess 7002. Most of the movable knob 72 except the front end thereof is exposed from the fixed knob 70. The tip end of the plate 80 or the side wall 6004 is held against the abutment walls 3004, preventing the buckle 16 to swing toward the bottom surface 3002 of the cavity 30.

Consequently, after the camera 100 is inserted in the front case member 12, the mating portion 40 of the rear case member 14 is brought into mating engagement with the mating portion 20 of the front case member 12, and the free end of the buckle 16 is turned into the cavity 30. The mating portion 20 of the front case member 12 and the mating portion 40 of the rear case member 14 now remain in mating engagement, holding the camera 100 in the water-resistant case 10.

A process of removing the camera 100 from the water-resistant case 10 will be described below.

While the user is orienting the water-resistant case 10 forwardly, the user holds the right side of the water-resistant case 10 with the left hand. The user applies the index finger of the right hand to the front surface 70B of the fixed knob 70, applies the thumb of the right hand to the rear surface 72A of the movable knob 72, and grips the fixed knob 70 and the movable knob 72 with the index finger and thumb of the right hand.

The user then moves the thumb to slide the movable knob 72 forwardly toward the fixed knob 70 against the bias of the helical spring 66.

When the movable knob 72 slides forwardly toward the fixed knob 70, the locking member 64 moves forwardly in unison with the movable knob 72 away from the engaging surfaces 3402 of the walls 34 until the opposite ends of the locking member 64 disengage from the respective engaging surfaces 3402 of the walls 34. Now, the buckle 16 is allowed to turn out of the cavity 30 about the pivot shaft 58. At this time, however, the buckle 16 is prevented from moving toward the pivot shaft 58, and the front case member 12 and the rear case member 14 are prevented from swinging open away from each other because the locking member 64 abuts against the walls 34 and the engaging walls 32, 6012 engage each other when attempts are made to move the buckle 16 toward the pivot shaft 58.

The user grips the fixed knob 70 and the movable knob 72 and lifts the free end of the buckle 16 to its erected position.

When the buckle 16 is thus swung open through a certain angle, the tip end of the locking member 64 is spaced from the tip ends of the walls 34, i.e., the tip end of the locking member 64 and the tip ends of the walls 34 are spaced from each other in the direction away from the bottom surface 3002 of the cavity 30, and the tip ends of the engaging walls 32 and the tip ends of the engaging walls 6012 are spaced from each other, i.e., the tip ends of the engaging walls 32 and the tip ends of the engaging walls 6012 are spaced from each other in the direction away from the bottom surface 3002 of the cavity 30, allowing the buckle 16 to move toward the pivot shaft 58. The front case member 12 and the rear case member 14 are now allowed to swing open away from each other.

The user opens the rear case member 14 from the front case member 12, and remove the camera 100 out of the front case member 12.

Advantages of the water-resistance case 10 according to the present embodiment will be described below.

For removing the camera 100 out of the water-resistant case 10, the index finger of the right hand is applied to the front surface 70B of the fixed knob 70, and the thumb is moved to slide the movable knob 72 forwardly toward the fixed knob 70 against the bias of the helical spring 66. The opposite ends of the locking member 64 disengage from the respective engaging surfaces 3402 of the walls 34. The buckle 16 is now allowed to turn out of the cavity 30 about the pivot shaft 58. At this time, the movable knob 72 is pressed forwardly by the thumb of the right hand, which applies forces tending to keep the rear case member 14 to mate with the front case member 12.

Therefore, even when the buckle 16 is released from the fixed position in the cavity 30, since forces remain acting to keep the rear case member 14 to mate with the front case member 12, the front case member 12 and the rear case member 14 are prevented from being inadvertently opened away from each other, and hence the camera 100 is prevented from dropping out.

If the electronic device to be accommodated in the water-resistant case 10 is of a small size, such as the camera 100, then since it is often customary for the user to put the camera 100 into and out of the water-resistant case 10 while the user is walking, the water-resistant case 10 is highly effective to prevent the camera 100 from dropping out.

In the present embodiment, furthermore, when the movable knob 72 is slid forwardly toward the fixed knob 70 and then the buckle 16 is swung through a certain angle, the buckle 16 is allowed to move toward the pivot shaft 58, i.e., toward the mating portion 40, so that the front case member 12 and the rear case member 14 can be swung open away from each other. Since the front case member 12 and the rear case member 14 can be swung open away from each other only when the movable knob 72 is slid and the buckle 16 is opened, the front case member 12 and the rear case member 14 are prevented from being inadvertently opened away from each other, and hence the camera 100 is prevented from dropping out. Even when the movable knob 72 is hit by something while the water-resistant case 10 is being used underwater, the front case member 12 and the rear case member 14 are prevented from being inadvertently opened away from each other, and hence the camera 100 is prevented from immersed in water.

In the present embodiment, when the movable knob 72 is remotest from the pivot shaft 58, i.e., is advanced to the foremost position, the movable knob 72 is placed entirely in the housing recess 7002 and the rear surface 72A of the movable knob 72 is positioned forwardly of the rear surface 70A of the fixed knob 70. When the index finger of the right hand is applied to the front surface 70B of the fixed knob 70, the thumb of the right hand is applied to the rear surface 72A of the movable knob 72, and the thumb is moved to slide the movable knob 72 forwardly away from the pivot shaft 58, the ball of the thumb can engage the inner wall surface which defines the housing recess 7002. Therefore, both the fixed knob 70 and the movable knob 72 can simultaneously be gripped with ease, and the buckle 16 can easily be swung open.

To allow the user to grip the rear surface 72A of the movable knob 72 easily, protruding dots similar to the protruding dots 7010 on the front surface 70B of the fixed knob 70 may be provided on the rear surface 72A of the movable knob 72. However, if the rear surface 72A of the movable knob 72 is positioned forwardly of the rear surface 70A of the fixed knob 70, and the thumb of the right hand can engage the inner wall surface which defines the housing recess 7002 as with the present embodiment, then the buckle 16 is relatively simple in structure.

In the illustrated embodiment, the water-resistant case 10 is constructed of the two case members 12, 14, and the present invention is applied to the respective mating portions 20, 40 of the case members 12, 14. However, the principles of the present invention are also applicable to a mating portion of a lid for openably closing an opening in a single case in a water-tight fashion.

In the illustrated embodiment, the mating portions 20, 40 are each in the shape of a rectangular frame. However, each of the mating portions 20, 40 according to the present invention may be in the shape of any of other frames, such as a circular frame.

The first engaging and disengaging portion and the second engaging and disengaging portion may be of any of various conventional structures, and are not limited to the illustrated structures.

The electronic device to be accommodated in the water-resistant casing according to the present invention has been illustrated as a digital camera. However, the electronic device is not limited to a digital camera, but may be any electronic device insofar as it can be accommodated in the water-resistant casing.

Although a certain preferred embodiment of the present invention has been shown and described in detail, it should be understood that various changes and modifications may be made therein without departing from the scope of the appended claims.

What is claimed is:

1. A water-resistant case for accommodating an electronic device, comprising:
    a first case member having a mating portion;
    a second case member having a mating portion;
    said first case member and said second case member jointly providing a space for accommodating the electronic device therein when the mating portion of said first case member and the mating portion of said second case member mate with each other;
    said first case member and said second case member having respective ends swingably coupled to each other, wherein said mating portion of said first case member and the mating portion of said second case member mate with each other when said first case member and said second case member swing relatively to each other about said ends;
said first case member having a side wall disposed on a free end of said first case member which is opposite to said end of said first case member, said side wall being disposed outwardly of the mating portion of said first case member, said side wall extending away from the mating portion of said first case member in the direction in which a free end of said second case member which is opposite to said end of said second case member mates with said free end of said first case member;
a buckle swingably mounted on said free end of said second case member outwardly of the mating portion of said second case member;
a first engaging and disengaging member disposed on said side wall for disengageably engaging said buckle;
a second engaging and disengaging member mounted on said buckle for disengageably engaging said first engaging and disengaging member to keep said first case member and said second case member in mating relation to each other when the mating portion of said first case member and the mating portion of said second case member mate with each other and said buckle engages said side wall;
a fixed knob mounted on said buckle at a position spaced from a mounted portion of said buckle which is swingably mounted on said free end of said second case member, in a direction away from said mating portions when the mating portion of said first case member and the mating portion of said second case member mate with each other and said buckle engages said side wall; and
a movable knob mounted on said buckle closely to a side of said fixed knob which faces said mounted portion, said movable knob being movable toward and away from said fixed knob and normally biased to move toward said mounted portion, wherein when said movable knob is moved toward said fixed knob, said movable knob releases said first engaging and disengaging member and said second engaging and disengaging member out of engagement with each other.

2. The water-resistant case according to claim 1, wherein said buckle has an inner surface which faces said side wall when said buckle engages said side wall and an outer surface positioned opposite to said inner surface, said fixed knob and said movable knob being disposed on said outer surface, said second engaging and disengaging member being disposed on said inner surface for movement in unison with said movable knob into and out of engagement with said first engaging and disengaging member.

3. The water-resistant case according to claim 1, wherein said buckle has an inner surface which faces said side wall when said buckle engages said side wall and an outer surface positioned opposite to said inner surface, said fixed knob and said movable knob being disposed on said outer surface, said second engaging and disengaging member being disposed on said inner surface, said side wall having a cavity for accommodating said buckle therein, said first engaging and disengaging member being disposed on a bottom surface of said cavity, wherein when said buckle is accommodated in said cavity, the outer surface of said buckle lies flush with an outer surface of said side wall.

4. The water-resistant case according to claim 1, wherein said fixed knob is disposed closely to an end of said buckle which is remote from said mounted portion.

5. The water-resistant case according to claim 1, wherein said fixed knob has a surface facing said mounted portion and having a housing recess which is open toward said mounted portion for housing said movable knob therein, and said movable knob has a surface facing said mounted portion, wherein when said first engaging and disengaging member and said second engaging and disengaging member are released out of engagement with each other, said movable knob is housed in said housing recess, said surface of said movable knob is positioned in said housing recess and spaced from said surface of said fixed knob in a direction away from said mounted portion.

6. The water-resistant case according to claim 1, wherein said first engaging and disengaging member is arranged to allow said buckle to swing away from said side wall and prevent said buckle from moving toward said mounted portion when said first engaging and disengaging member is released out of engagement with said second engaging and disengaging member in response to movement of said movable knob toward said fixed knob, and also to allow said buckle to move toward said mounted portion when said buckle is swung away from said side wall while said first engaging and disengaging member is being released out of engagement with said second engaging and disengaging member.

7. The water-resistant case according to claim 1, wherein said buckle has an inner surface which faces said side wall when said buckle engages said side wall and an outer surface positioned opposite to said inner surface, said fixed knob and said movable knob being disposed on said outer surface, said second engaging and disengaging member being disposed on said inner surface, said side wall having a cavity for accommodating said buckle therein, said first engaging and disengaging member being disposed on a bottom surface of said cavity, wherein said inner surface of said buckle and said bottom surface of said cavity have engaging walls disposed respectively thereon, said engaging walls engage each other to prevent said buckle from moving toward said mounted portion when said buckle engages said side wall and is accommodated in said cavity, and said engaging walls disengage from each other when said buckle is swung away from said bottom surface of said cavity.

8. The water-resistant case according to claim 1, wherein the mating portion of one of said first case member and said second case member has a ridge projecting therefrom and extending fully along said mating portion, the mating portion of the other of said first case member and said second case member has a groove defined therein and extending fully along said mating portion for receiving said ridge inserted therein, with a seal member inserted in and extending fully along said groove, wherein when the mating portion of said first case member and the mating portion of said second case member mate with each other, said seal member is compressed by said ridge to joint said mating portions to each other in a water-tight manner, said groove being defined by a wall having two recesses defined therein at a spaced interval along said groove, leaving a wall portion between said recesses, said groove being open into said other case member through said recesses, wherein said seal member comprises a main body inserted in and extending fully along said groove and a knob having two arms spaced from each other along said main body and projecting from said main body respectively through said recesses into said other case member and a joint arm interconnecting respective distal ends of said arms.

* * * * *